Sept. 22, 1931.    L. E. MILLER    1,824,614
WINDER DRIVE
Filed Sept. 20, 1928

INVENTOR.
Lloyd E. Miller
BY
Fay, Oberlin & Fay
ATTORNEYS.

Patented Sept. 22, 1931

1,824,614

UNITED STATES PATENT OFFICE

LLOYD E. MILLER, OF CLEVELAND HEIGHTS, OHIO, ASSIGNOR TO THE RELIANCE ELECTRIC AND ENGINEERING COMPANY, OF CLEVELAND, OHIO, A CORPORATION OF OHIO

WINDER DRIVE

Application filed September 20, 1928. Serial No. 307,205.

In the winding of rolls of web material, such for instance as paper or textiles, particularly paper, difficulties arise through the tendency of the material to wrinkle or tear. While care in adjusting the drive rate for the respective rolls is important in minimizing such conditions, there is yet a tendency for a certain amount of slack to gather when the drive is shut down, and on starting up, this slack will be taken up with a jerk and paper under such circumstances is frequently torn. Wrinkling and unevenness of winding is essentially prone to occur under such conditions. A drive arrangement which will avoid these difficulties is accordingly of fundamental importance and highly desirable.

To the accomplishment of the foregoing and related ends, the invention, then, consists of the features hereinafter fully described, and particularly pointed out in the claims, the following description and the annexed drawings setting forth in detail certain structure embodying the invention, such being illustrative however of but one of the various ways in which the principle of the invention may be employed.

In said annexed drawings:—

Figure 1:
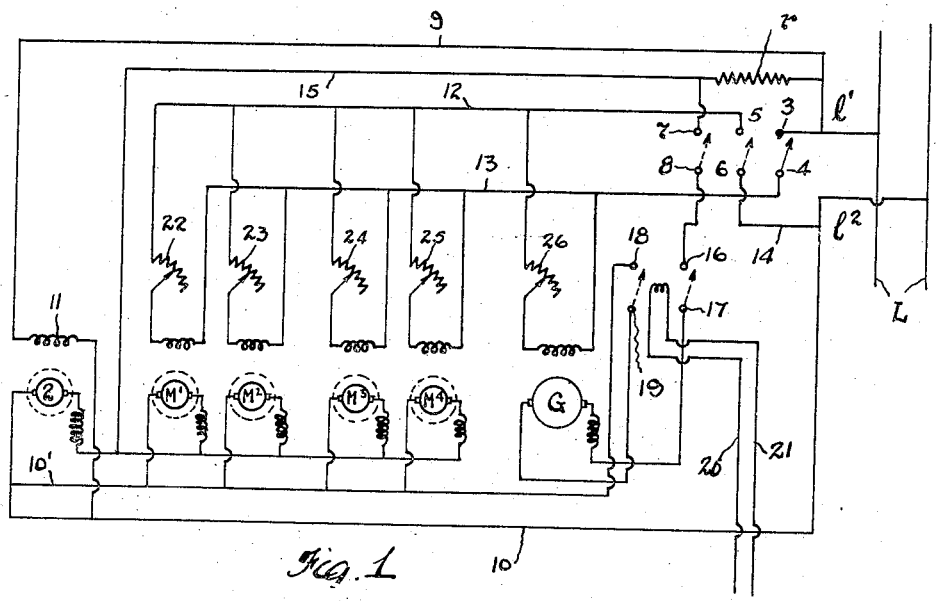
Figure 2:
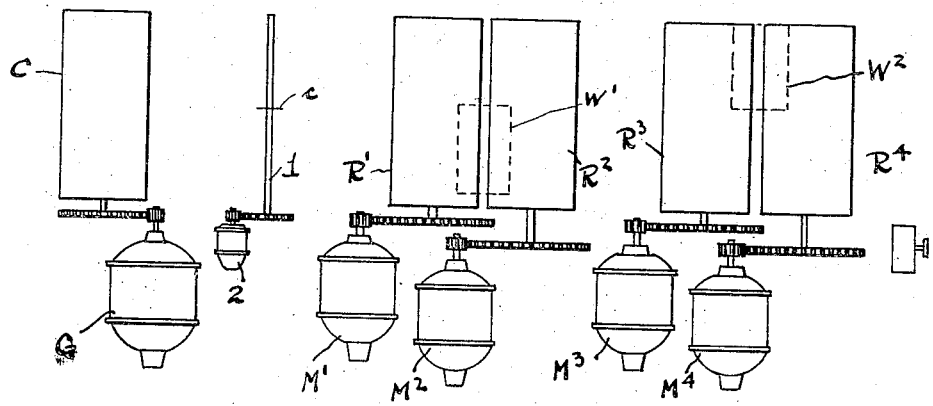

Fig. 1 is a wiring diagram of a layout embodying the invention; and Fig. 2 is a diagrammatic plan view of equipment in accordance therewith.

Referring more particularly to the drawings, there is shown a calender C, beyond which is a slitter cutter $c$ carried by shaft 1 driven by a motor 2. In further relation with the cutter is a winder assemblage, comprising rolls $R'$, $R^2$, $R^3$, $R^4$, these being driven respectively by motors $M'$, $M^2$, $M^3$, $M^4$. Advantageously, a generator G is arranged to be driven off the calender and to supply E. M. F. to the motors $M'$, $M^2$, $M^3$, $M^4$, and 2. Preferably, the fields of these motors are compounded for instance to provide desirable operating speed characteristics, and the shunt winding thereof may be supplied by E. M. F. from any convenient line supply L of direct current character, and the series windings of the fields being connected with the generator G. The slitter motor may be similarly compounded, and its shunt winding be supplied from the line L, and its series winding be supplied from the generator G. As indicated in the wiring diagram, Fig. 1, the leads $1'$, $1^2$, may be connected to terminals 3 and 6, these being conveniently in assembly with the other terminals 5, 4, 7, 8, on a suitable switchboard or block, and from the leads $1'$, $1^2$, connections 9 and 10 respectively supply the shunt winding 11 of the slitter motor 2. From switch contacts 4 and 5, connections 13 and 12 respectively supply the shunt windings of the fields of the motors $M'$, $M^2$, $M^3$, $M^4$, and the generator G. Switch contact 6 has a connection 14 to the lead $1^2$. Switch contact 7 has a connection 15 to the series windings of the motors, and the contact 8 leads through a second switch having contacts 16 and 17, to the generator. This switch further has contacts 18 and 19 connected with the armatures of the motors and of the generator G. Advantageously, this latter switch is of the electromagnetic remote control type, the magnet winding thereof being connected through leads 20, 21 to the controller for the calender drive (not shown), and with such arrangement, on energizing the calender drive, the switch contacts 16, 17, 18, 19, are closed, such that the circuits for the generator and motors may become operative.

It will be observed also that through the connections 10, 15, and a resistance $r$, a circuit is continuously established through the series windings of the motors 2, $M'$, $M^2$, $M^3$, $M^4$. The value of the resistance $r$ is so adjusted that the motors are energized sufficiently to just maintain tension, short of actual turning.

As will be readily understood from the foregoing, the line current through connections 9 and 10 is continuously available for the shunt winding 11 of the slitter motor, and through the resistance $r$ and connections 15, $10'$ and 10 to the series windings of the motors 2, $M'$, $M^2$, $M^3$, $M^4$. Correspondingly, the motors are maintained in tension, such as to exert a continuous draw, holding the web of material taut when the winding drive is shut down, and thereby avoiding slack and wrinkling and possible breakage. On closing the paired switch contacts 3 and 4, 5 and 6, 7 and 8 respectively, as may be accomplished by any desired detail structure, the circuit is completed through the second switch with its paired contacts 16 and 17, 18 and 19, this switch in the case assumed having been already electromagnetically closed on the operation of the calender controller. Correspondingly, the plant is set in operation with the slitter motor starting off slightly in the lead due to the existent energization allowing a greater initial starting torque on closing the switch contacts, whereby tearing of the web is avoided at this point, and the winder motors drive their respective rolls providing thereby winding troughs in which the material may be wound up as indicated at $w'$, $w^2$. For adjustment of the particular differential rates requisite for the respective motors $M'$, $M^2$, $M^3$, $M^4$, shunt field rheostats 22, 23, 24 and 25 may be employed, and a similar rheostat 26 may be had for control of the generator field.

As will thus be seen a winder drive arrangement is had in which all requisite flexibility of control is had for the winder motors, these receiving their energizing E. M. F. in a manner to insure the proper range and efficiency, and the slitter motor is so coordinated as to be brought into movement slightly in advance of the starting of the winder motors, and continue turning slightly after the stoppage of the starting motors, thereby avoiding tearing at this point, and furthermore, by reason of the auxiliary E. M. F. supply through controlled resistance, to the winder motors, the latter are continuously energized sufficiently to maintain suitable tension upon the web at all times when the drive is shut down, and on starting up, the E. M. F. supplied from the drive generator takes charge in the respective motors, as desired.

Other modes of applying the principle of the invention may be employed, change being made as regards the details disclosed, provided the means stated in any of the following claims, or the equivalent of such, be employed.

I therefore particularly point out and distinctly claim as my invention:—

1. Apparatus of the character described, which comprises paired horizontal cylinders presenting a trough adapted to rotate a winding roll of web material, a cutter for slitting web fed thereto, an electric motor drive for said winder cylinders, a circuit for supplying driving E. M. F. for the normal operation of said motor drive, and means for supplying a tensioning E. M. F. thereto when the circuit for supplying driving E. M. F. is broken.

2. Apparatus of the character described, which comprises paired horizontal cylinders presenting a trough adapted to rotate a winding roll of web material, a cutter for slitting the web fed thereto, an electric motor for driving said cylinders, means for supplying driving E. M. F. for the normal operation of said motor drive, and a circuit having a controlling resistance for supplying tensioning E. M. F. for said motor when the circuit for supplying driving E. M. F. is broken.

3. Apparatus of the character described, which comprises a slitting-cutter, an electric motor for driving said cutter, winding means adapted to be fed by material from said cutter, an electric motor means for driving said winding means, means for supplying driving E. M. F. for the normal operation of said motor means, auxiliary means for supplying E. M. F. to said slitter motor and for supplying tensioning E. M. F. to said winder driving motor means when the circuit for supplying driving E. M. F. is broken, and co-ordinated switch-contacts for controlling the cutter motor and winder motor means.

4. Apparatus of the character described, which comprises a cutter adapted to slit a web of material fed therepast, an electric motor for driving said cutter, paired horizontal cylinders presenting troughs adapted to rotate winding rolls of the web material from said cutter, electric motors for driving said cylinders, a circuit for supplying E. M. F. for normally driving said winder motors, a circuit for supplying tensioning E. M. F. to said motors on disconnection of said first-named circuit, a circuit for supplying E. M. F. to operate said cutter motor before and after the winder motors, and switchboard means for controlling said circuits.

Signed by me this 13th day of September, 1928.

LLOYD E. MILLER.